United States Patent
Takeno et al.

(10) Patent No.: US 8,766,155 B2
(45) Date of Patent: Jul. 1, 2014

(54) COORDINATE RECOGNIZING APPARATUS AND CONTROL METHOD THEREFOR

(75) Inventors: Yuishi Takeno, Shizuoka-ken (JP);
Shinji Saegusa, Shizuoka-ken (JP);
Takuya Ogishima, Shizuoka-ken (JP);
Sadatoshi Oishi, Shizuoka-ken (JP)

(73) Assignee: Toshiba TEC Kabushiki Kaisha, Tokyo (JP)

( * ) Notice: Subject to any disclaimer, the term of this patent is extended or adjusted under 35 U.S.C. 154(b) by 414 days.

(21) Appl. No.: 13/286,698

(22) Filed: Nov. 1, 2011

(65) Prior Publication Data

US 2012/0104227 A1 May 3, 2012

Related U.S. Application Data

(60) Provisional application No. 61/409,926, filed on Nov. 3, 2010.

(51) Int. Cl.
*G01C 21/02* (2006.01)
*G01C 21/24* (2006.01)

(52) U.S. Cl.
USPC .............. 250/206.1; 250/221; 250/559.19; 345/173; 356/614; 356/621

(58) Field of Classification Search
USPC .............. 250/559.12, 559.13, 559.24, 222.2, 250/206.1; 356/901, 625, 631–636, 638; 345/173–179

See application file for complete search history.

(56) References Cited

U.S. PATENT DOCUMENTS

| | | | |
|---|---|---|---|
| 4,943,806 A | 7/1990 | Masters et al. | |
| 6,429,857 B1 * | 8/2002 | Masters et al. | 345/175 |
| 6,690,363 B2 * | 2/2004 | Newton | 345/173 |
| 2011/0242056 A1 * | 10/2011 | Lee et al. | 345/175 |

FOREIGN PATENT DOCUMENTS

JP    H04-036353    6/1992

OTHER PUBLICATIONS

U.S. Appl. No. 13/286,738, filed Nov. 1, 2011.

* cited by examiner

*Primary Examiner* — Francis M Legasse, Jr.
(74) *Attorney, Agent, or Firm* — Patterson & Sheridan, L.L.P.

(57) ABSTRACT

According to one embodiment, a coordinate recognizing apparatus includes plural light emitting elements, plural light receiving elements, a memory, and a controller. The memory stores, concerning plural pairs of the light emitting elements and the light receiving elements set in advance, reference values used for determination of blocking of a light path. The controller performs, concerning the respective pairs, actions for collecting, plural times, a difference between first intensity indicated by a detection signal output from the light receiving element, which is a pair of the light emitting element, in a state in which the light emitting element is caused to emit light and second intensity indicated by a detection signal output from the light receiving element during non-light emission of the light emitting element and updating the reference value of the pair stored in the memory using a minimum of differences collected plural times.

20 Claims, 7 Drawing Sheets

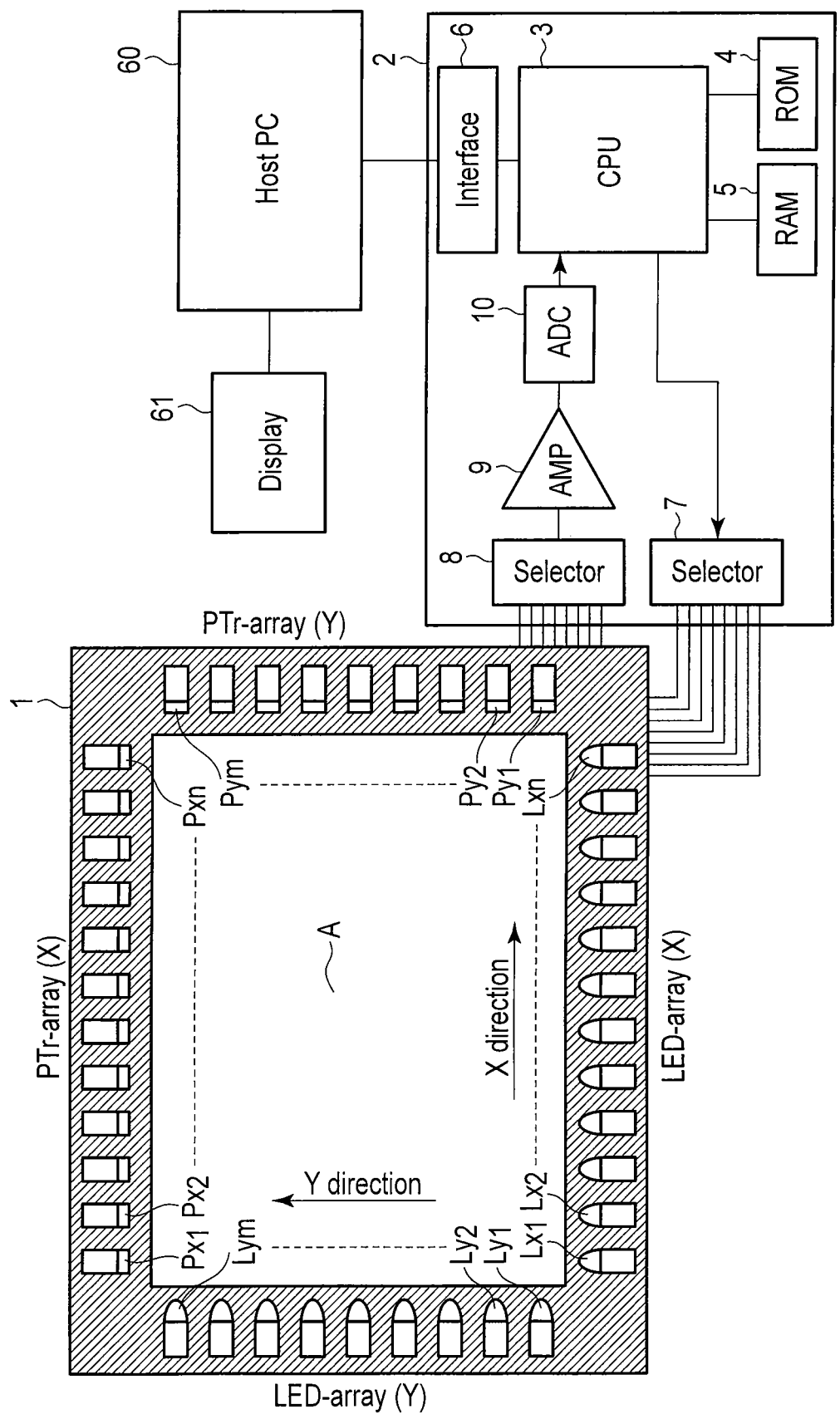
F I G. 1

US 8,766,155 B2

COORDINATE RECOGNIZING APPARATUS AND CONTROL METHOD THEREFOR

CROSS-REFERENCE TO RELATED APPLICATIONS

This application is based upon and claims the benefit of priority from U.S. provisional application 61/409,926, filed on Nov. 3, 2010, the entire contents of which are incorporated herein by reference.

FIELD

Embodiments described herein relate generally to a coordinate recognizing apparatus that recognizes coordinates of the position of operation by a user and a control method for the coordinate recognizing apparatus.

BACKGROUND

In the past, there is known an optical coordinate recognizing apparatus such as a touch panel including plural infrared light emitting elements arranged to be opposed to one another and infrared light receiving elements provided to respectively correspond to the light emitting elements.

In general, the optical coordinate-recognizing apparatus detects whether a light path formed between the light emitting element and the light receiving element, which form a pair, is blocked or not blocked and calculates coordinates, of the position of operation by a user on the basis of a result of the detection.

Specifically, the optical coordinate recognizing apparatus determines presence or absence of light blocking by comparing a difference between an output voltage of the light receiving element output while the light emitting element is on and an output voltage of the light receiving element output while the light emitting element is off and a predetermined reference value.

The accuracy of the coordinate recognition by the optical coordinate recognizing apparatus is deteriorated by the influence of disturbance light such as the sunlight or illumination. In order to reduce the deterioration in the accuracy of the coordinate recognition due to the disturbance light as much as possible, it is necessary to update, as required, the reference value to an appropriate value corresponding to an environment of use of the coordinate recognizing apparatus.

BRIEF DESCRIPTION OF THE DRAWINGS

FIG. 1 is a block diagram of a hardware configuration of a coordinate recognizing apparatus according to embodiments;

DETAILED DESCRIPTION

Figure 2:
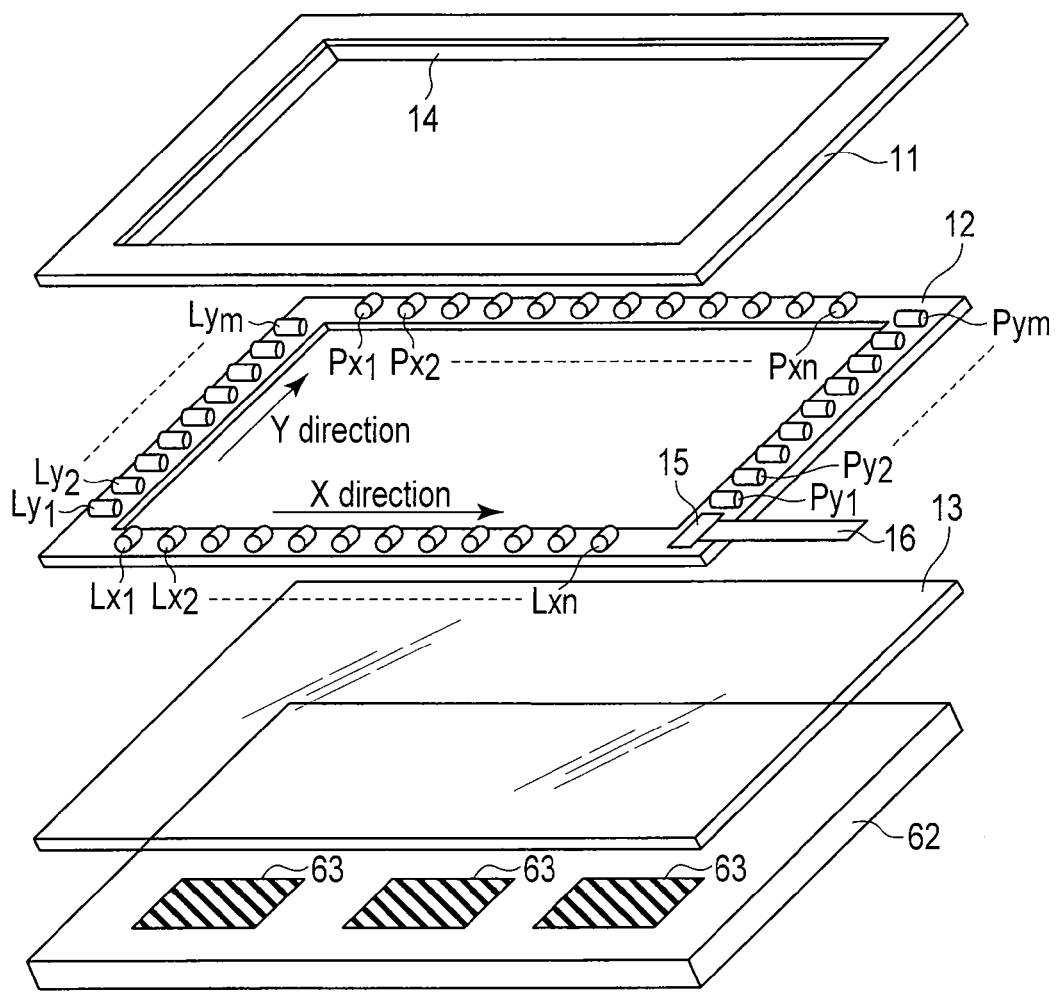
FIG. 2 is a disassembled perspective view of an input device and the like included in the coordinate recognizing apparatus according to the embodiments.

In general, according to one embodiment, a coordinate recognizing apparatus includes plural light emitting elements, plural light receiving elements, a memory, and a controller.

The plural light receiving elements are arranged to be opposed to the respective light emitting elements and output detection signals corresponding to the intensity of received light. The memory stores, concerning plural pairs of the light emitting elements and the light receiving elements set in advance, reference values used for determination of blocking of a light path. The controller performs, concerning the respective pairs, actions for collecting, plural times, a difference between first intensity indicated by a detection signal output from the light receiving element, which is a pair of the light emitting element, in a state in which the light emitting element is caused to emit light and second intensity indicated by a detection signal output from the light receiving element during non-light emission of the light emitting element and updating the reference value of the pair stored in the memory using a minimum of differences collected plural times.

Several embodiments are explained below with reference to the drawings.

In the embodiments, a coordinate recognizing apparatus that optically detects touch operation on a display is explained as an example.

Hardware Configuration of the Coordinate Recognizing Apparatus

A hardware configuration common to the embodiments is explained.

FIG. 1 is a block diagram of a hardware configuration of the coordinate recognizing apparatus. The coordinate recognizing apparatus includes an input device 1 and a controller 2.

The input device 1 includes plural light emitting elements Lx1 to Lxn (n is an integer equal to or larger than 2) arrayed one-dimensionally, light receiving elements Px1 to Pxn arrayed one-dimensionally in parallel to the array of the light emitting elements Lx1 to Lxn, light emitting elements Ly1 to Lyn (m is an integer equal to or lager than 2) arrayed one-dimensionally in a direction orthogonal to an arraying direction of the light emitting elements Lx1 to Lxn, and light receiving elements Py1 to Pym arrayed one-dimensionally in parallel to the array of the light emitting elements Ly1 to Lym.

The light emitting elements Lx1 to Lxn and Ly1 to Lym are light emitting diodes (LEDs) that are driven by the controller 2 and generate infrared rays. The light receiving elements Px1 to Pxn and Py1 to Pym are phototransistors (PTrs) that receive the infrared rays and output signals corresponding to the intensity of the received infrared rays to the controller 2. An area A surrounded by the light emitting elements Lx1 to Lxn and Ly1 to Lym and the light receiving elements Px1 to Pxn and Py1 to Pym is an area where operation by an object such as a finger of a user or a touch pen is detected. In an example shown in FIG. 1 and FIG. 2 referred to later, n is set to 12 and m is set to 9.

In an example explained in the embodiments, the light emitting elements Lx1 to Lxn and the light receiving elements Px1 to Pxn are arrayed to be opposed to each other in an X direction and the light emitting elements Ly1 to Lym and the light receiving elements Py1 to Pym are arrayed to be opposed to each other in a Y direction. N+m light paths are formed by pairs of the light emitting element Lx1 and the light receiving element Px1, the light emitting element Lx2 and the light receiving element Px2, the light emitting element Lx3 and the light receiving element Px3, . . . , and the light emitting element Lxn and the light receiving element Pxn and pairs of the light emitting element Ly1 and the light receiving element Py1, the light emitting element Ly2 and the light receiving element Py2, the light emitting element Ly3 and the light receiving element Py3, . . . , and the light emitting element Lym and the light receiving element Pym.

In the following explanation, identification numbers p (p is an integer equal to or larger than 1 and equal to or smaller than n+m) are affixed to the pairs of the light emitting element Lx1 and the light receiving element Px1, the light emitting element Lx2 and the light receiving element Px2, the light emitting element Lx3 and the light receiving element Px3, . . . , and the light emitting element Lxn and the light receiving element Pxn and the light emitting element Ly1 and the light receiving element Py1, the light emitting element Ly2 and the light receiving element Py2, the light emitting element Ly3 and the light receiving element Py3, . . . , and the light emitting element Lym and the light receiving element Pym in this order.

The controller 2 includes a CPU (Central Processing Unit) 3, a ROM (Read Only Memory) 4, a RAM (Random Access Memory) 5, an interface 6, a selector 7, a selector 8, an amplifier 9, and an AD converter 10.

The ROM 4 has stored therein fixed data such as various default values and computer programs. The RAM 5 functions as a main memory and forms various work memory areas.

The interface 6 is, for example, RS232C and connects a host computer 60 and the coordinate recognizing apparatus to perform communication. The host computer 60 is, for example, a personal computer and connected to a display 61 such as an LCD (Liquid Crystal Display). The input device 1 is arranged in front of the display 61. The host computer 60 displays, on the display 61, various GUIs (Graphical User Interfaces) that can be operated by the input device 1.

The CPU 3 executes the computer programs stored in the ROM 4 and executes various kinds of processing related to actions of the coordinate recognizing apparatus. In particular, in recognizing coordinates of the position of operation on a display surface of the display 61 by the user (hereinafter referred to as operation coordinates), the CPU 3 outputs driving signals for the light emitting elements Lx1 to Lxn and Ly1 to Lym to the selector 7.

The selector 7 selectively supplies the driving signals, which are input from the CPU 3, to the light emitting elements Lx1 to Lxn and Ly1 to Lym via a flexible cable 16 (see FIG. 2) that connects the input device 1 and the controller 2. The light emitting elements that receive the supply of the driving signals generate infrared rays.

If the light receiving elements Px1 to Pxn and Py1 to Pym receive the infrared rays emitted from the light emitting elements Lx1 to Lxn and Ly1 to Lym, detection signals corresponding to the intensity of the received infrared rays are output to the selector 8 via the flexible cable 16. The selector 8 selectively captures the input detection signals and outputs the detection signals to the amplifier 9.

The amplifier 9 amplifies the input detection signals to a predetermined level and outputs the detection signals to the AD converter 10. The AD converter 10 converts the detection signals input from the amplifier 9 into digital detection signals and outputs the digital detection signals to the CPU 3.

The CPU 3 calculates coordinates of operation by the user using the digital detection signals input from the AD converter 10 and outputs a calculation result to the host computer 60 via the interface 6.

The host computer 60 executes various kinds of processing using the operation coordinates input from the controller 2. For example, the host computer 60 compares the operation coordinates and coordinates of various GUI components displayed on the display 61. If an operable GUI component is present in the operation coordinates, the host computer 60 executes processing corresponding to the GUI component. As another example, the host computer 60 enlarges or reduces an image displayed on the display 61 or slides the image in up down and left right directions on the basis of a temporal change of the operation coordinates.

The configuration of the input device 1 is explained in detail. FIG. 2 is a disassembled perspective view of the input device 1 and an LCD panel 62 included in the display 61.

As shown in FIG. 2, the input device 1 includes an outer frame 11, a printed wiring board 12, and a transparent acrylic plate 13. The outer frame 11 is formed of, for example, ABS resin. A rectangular opening of the outer frame 11 is equivalent to the area A where operation by the user is detected shown in FIG. 1. A cover 14 for covering the light emitting elements Lx1 to Lxn and Ly1 to Lym and the light receiving elements Px1 to Pxn and Py1 to Pym is provided under the outer frame 11 along an edge of the opening. The cover 14 is formed of black resin enough for transmitting an infrared ray and disabling viewing of the light emitting elements Lx1 to Lxn and Ly1 to Lym and the light receiving elements Px1 to Pxn and Py1 to Pym from the inner side of the opening.

The printed wiring board 12 is formed in a rectangular frame shape having an opening of substantially the same size as the opening of the outer frame 11. The light emitting elements Lx1 to Lxn and the light receiving elements Px1 to Pxn are arranged at an equal pitch to be opposed to each other on long sides of the printed wiring board 12 indicated by "X direction" in FIG. 2. On the other hand, the light emitting elements Ly1 to Lym and the light receiving elements Py1 to Pym are arranged at an equal pitch to be opposed to each other on short sides of the printed wiring board 12 indicated by "Y direction" in FIG. 2.

In such a configuration, all the light emitting elements Lx1 to Lxn and Ly1 to Lym and the light receiving elements Px1 to Pxn and Py1 to Pym are included in the same plane. The plane is defined as XY plane.

A connector 15 is provided on the printed wiring board 12. One end of the flexible cable 16 is connected to the connector 15.

The acrylic plate 13 is a rectangular flat plate of a size larger than the opening of the outer frame 11 and the printed wiring board 12 and smaller than the outer hull of the outer frame 11.

In FIG. 2, areas 63 indicated by hatching on the LCD panel 62 show images of GUI components and the like displayed on the LCD panel 62.

Figure 3:
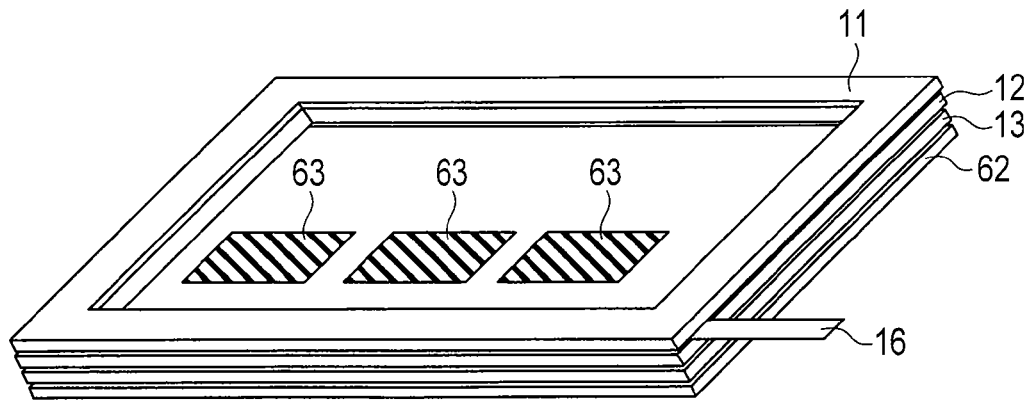
FIG. 3 is a perspective view of a state in which elements shown in FIG. 2 are fixed.

A perspective view of a state in which the outer frame 11, the printed wiring board 12, the acrylic plate 13, and the LCD panel 62 are place one on top of another in this order and fixed is shown in FIG. 3. An image displayed on the LCD panel 62 can be viewed from the outside via the acrylic plate 13. If the user touches the acrylic plate 13 with a finger, a touch pen, or the like in order to operate a screen of the LCD panel 62, a part of a light path formed in the XY plane by the light emitting elements Lx1 to Lxn and Ly1 to Lym and the light receiving elements Px1 to Pxn and Py1 to Pym is blocked by the finger, the touch pen, or the like. As explained in detail later, the controller 2 recognizes coordinates of an operation position on the XY plane on the basis of a combination of the light emitting element and the light receiving element corresponding to the light path blocked in this way.

First to fifth embodiments related to actions of the coordinate recognizing apparatus having the configuration explained above are explained below.

First Embodiment

Figure 4:
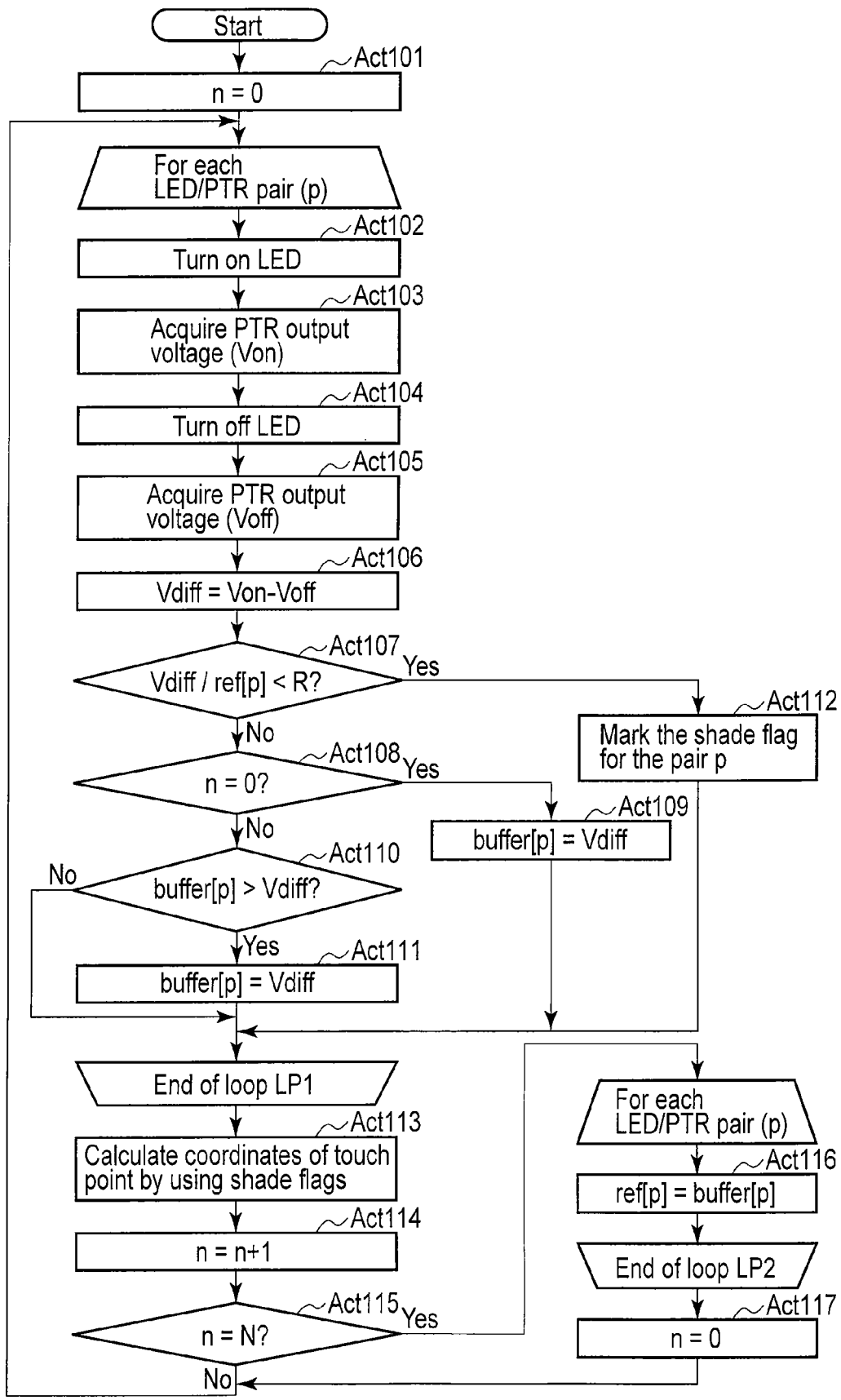
FIG. 4 is a flowchart for explaining actions of a controller according to a first embodiment.

FIG. 4 is a flowchart for explaining actions of the controller 2 according to the first embodiment. The actions shown in the flowchart are started, for example, when the coordinate recognizing apparatus starts. During the start of the coordinate recognizing apparatus, as preparation processing, the controller 2 performs processing for forming a counter n, a variable Vdiff, an array ref(p), an array buffer(p), and an array sfg(p) in the RAM 5.

The array ref(p) is an array, which has the identification numbers p of pairs of light emitting elements and light receiving elements as arguments, for storing reference values (reference voltages) used for determination of blocking of respective light paths formed by the pairs. The array buffer(p) is an array, which has the identification numbers p of the pairs as arguments, for storing candidate values for updating the reference voltages of the pairs stored in the array ref(p). The array sfg(p) is an array, which has the identification numbers p of the pairs as arguments, for storing results of the determination of the blocking of the respective light paths formed by the pairs of the light emitting elements and the light receiving elements.

Further, as the preparation processing, the controller 2 performs processing for determining an initial value of ref(p). This processing is processing for, for example, concerning the pair indicated by each of the identification numbers p, obtaining an output voltage Von from the light receiving element of the pair in a state in which the light emitting element of the pair is caused to emit light, obtaining an output voltage Voff from the light receiving element of the pair in a state in which the light emitting element of the pair is turned off, and setting a value obtained by subtracting Voff from Von as an initial value of ref(p) related to the identification number p of the pair. Concerning all the identification numbers p, the controller 2 sets values of arrays buffer(p) and sfg(p) to 0.

After the preparation processing explained above, the controller 2 sets the counter n to 0 (Act 101).

Thereafter, the controller 2 enters a loop LP1 including actions in Acts 102 to 112 between "For each LED/PTR pair (p)" and "End of loop" in the flowchart. The loop LP1 is a loop for performing light blocking determination concerning the pairs indicated by the identification numbers p=1 to n+m and measurement of buffer(p). The pair set as the processing target every time the controller 2 performs the actions of the loop LP1 is started from p=1 and incremented by one every time the loop LP1 reaches "End of loop". If the processing for the p=n+m pairs is completed, the loop LP1 ends.

In the loop LP1, first, the controller 2 causes the light emitting element of the pair indicated by the identification number p set as the processing target of the present loop LP1 to emit light (Act 102). In this state, the controller 2 obtains the output voltage Von (first intensity) from the light receiving element of the same pair (Act 103).

First, the controller 2 turns off the light emitting element of the pair indicated by the identification number p set as the processing target of the present loop LP1 (Act 104). In this state, the controller 2 obtains an output voltage Voff (second intensity) from the light receiving element of the same pair (Act 105).

After obtaining Von and Voff, the controller 2 calculates a difference between Von and Voff and substitutes a calculation result in Vdiff (Act 106).

Subsequently, the controller 2 determines whether a ratio of Vdiff and ref(p) related to the identification number p set as the processing target of the present loop LP1 is smaller than a threshold R for light blocking determination (Vdiff/ref(p)<R) (Act 107). The threshold R is a value for dividing the ratio of Vdiff and ref(p) (Vdiff/ref(p)) into a range during light blocking and a range during non-light blocking. The threshold R is empirically, experimentally, or theoretically determined and stored in the ROM 4 in advance.

As a result of the determination in Act 107, if the ratio of Vdiff and ref(p) is equal to or larger than the threshold R for light blocking determination (Vdiff/ref(p)≥R; No in Act 107), under determination that a light path formed between the light emitting element and the light receiving element of the pair is not blocked through operation by the user, the controller 2 determines whether a value of the counter n is 0 (Act 108).

If the counter n is 0 (Yes in Act 108), the controller 2 substitutes Vdiff in buffer(p) related to the identification number p set as the processing target of the present loop LP1 (Act 109). After Act 109, the controller 2 ends the loop LP1 related to the identification number p.

On the other hand, if the counter n is not 0 (No in Act 108), the controller 2 determines whether Vdiff is smaller than buffer(p) related to the identification number p set as the processing target of the present loop LP1 (buffer(p)>Vdiff) (Act 110). As a result of the determination, if Vdiff is smaller than buffer(p) (buffer(p)>Vdiff; Yes in Act 110), the controller 2 substitutes Vdiff in buffer(p) (Act 111). After Act 111, the controller 2 ends the loop LP1 related to the identification number p.

As a result of the determination in Act 110, if Vdiff is equal to or larger than buffer(p) (buffer(p)≤Vdiff; No in Act 110), the controller 2 ends the loop LP1 related to the identification number p without substituting Vdiff in buffer(p).

If the ratio of Vdiff and ref(p) is smaller than the threshold R for light blocking determination in Act 107 (Vdiff/ref(p)<R; Yes in Act 107), under determination that the light path formed between the light emitting element and the light receiving element related to the pair is blocked through operation by the user, the controller 2 sets sfg(p) related to the identification number p set as the processing target of the present loop LP1 to 1 (Act 112). After Act 112, the controller 2 ends the loop LP1 related to the identification number p.

If the actions related to the loop LP1 are executed concerning the respective identification numbers p, sfg(p) of the pair corresponding to the light path blocked by the finger of the user or the like changes to 1 and sfg(p) of the pair corresponding to a position not blocked by the finger or the like changes to 0.

The Controller 2 calculates coordinates of the position of operation by the user using such sfg(p) (Act 113). For example, the controller 2 calculates a center point of a range of the identification numbers p, a value of sfg(p) related to which among sfg(1) to sfg(n) corresponding to the light receiving elements Px1 to Pxn is 1, and sets an X direction position corresponding to the point as an X coordinate of the operation position. The controller 2 calculates a center point of a range of the identification numbers p, a value of sfg(p) related to which among sfg(n+1) to sfg(m) corresponding to the light receiving elements Py1 to Pym is 1, and sets a Y direction position corresponding to the point as a Y coordinate of the operation position.

Besides, as a method of calculating coordinates using sfg(p), various methods can be adopted. The controller 2 outputs the coordinates of the operation position recognized in this way to the host computer 60. The host computer 60 performs various kinds of processing using the coordinates of the operation position input from the coordinate recognizing apparatus.

If the controller 2 calculates the coordinates of the operation position in Act 113, the controller 2 resets the value of sfg(p) to 0 in order to wait for the next coordinate calculation.

After Act 113, the controller 2 increments the value of the counter n by one (Act 114). Further, the controller 2 determines whether the value of the counter n after the increment coincides with a default number of times N (Act 115). The default number of times N is set in advance and stored in the ROM 4. The default number of times N is set to at least a value equal to or larger than 2 (N≥2).

If the value of the counter n does not coincide with the default number of times N in Act 115 (n≠N; No in Act 115), the controller 2 enters the loop LP1 again and executes the actions related to Acts 102 to 112 concerning the pairs indicated by the identification numbers p=1 to n+m.

If the actions related to the loop LP1 are executed N times in this way, a minimum of Vdiff obtained if it is determined in Act 107 that the light path is blocked among Vdiff collected N times concerning the pairs indicated by the identification numbers p is stored in buffer(p).

If the value of the counter n reaches the default number of times N before long (n=N; Yes in Act 115), the controller 2 enters a loop LP2 including an action in Act 116 between "For each LED/PTR pair (p)" and "End of loop" in the flowchart. The pair set as the processing target every time the controller 2 performs the action of the loop LP2 is started from p=1 and incremented by one every time the loop LP2 reaches "End of loop". If the processing for the p=n+m pairs is completed, the loop LP2 ends.

In the loop LP2, concerning the pair indicated by the identification number p set as the processing target of the present loop LP2, the controller 2 rewrites a value of ref(p) with a value of buffer(p) (Act 116).

If such a loop LP2 is executed concerning the respective identification numbers p, a minimum of Vdiff obtained if it is determined in Act 107 that the light path is blocked among Vdiff collected N times concerning the pairs indicated by the identification numbers p is stored in ref(p).

If the action related to the loop PL2 is completed, the controller 2 resets the value of the counter n to 0 (Act 117). Thereafter, the controller 2 enters the loop LP1 again and repeats the actions explained above.

In this way, the controller 2 collects, plural times, the difference Vdiff between the voltage Von (the first intensity) output from the light receiving element, which is a pair of the light emitting element, in a state in which the light emitting element is caused to emit light and the voltage Voff (the second intensity) output from the light receiving element during non-light emission of the light emitting element and performs, concerning the respective pairs indicated by the identification numbers p=1 to n+m, an action for updating the reference value ref(p) of the pair stored in the RAM 5 using the minimum buffer(p) of differences collected plural times.

With such a configuration, the reference value used for the light blocking determination is updated as required according to an environment of use of the coordinate recognizing apparatus. Therefore, it is possible to suppress deterioration in accuracy of coordinate recognition due to disturbance light.

In an environment in which the intensity of the disturbance light changes in a short period, an extremely large difference Vdiff is sometimes obtained. If the reference value is simply rewritten with the difference Vdiff collected every time, even if the extremely large difference Vdiff is calculated, the reference value ref(p) is written with a value of the difference Vdiff. As a result, it is likely that, although the user does not operate the operation area A, a light path is determined as being blocked in the light blocking determination. On the other hand, in this embodiment, since the reference value is updated using a minimum of differences collected plural times, even if the intensity of the disturbance light temporarily increases, it is possible to prevent setting of an extremely high reference value.

Second Embodiment

The second embodiment is explained.

The intensity of disturbance light could substantially change even while Vdiff is collected the default number of times N. If the intensity of the disturbance light temporarily increases to be extremely high, the difference Vdiff decreases to be extremely small. As a result, a value of ref(p) is set extremely small. Although the operation area A is operated by a user, it is likely that a light path passing the position of the operation is determined as being not blocked.

In order to cope with such a situation, the second embodiment is different from the first embodiment in that a lower limit of ref(p) is set.

Figure 5:
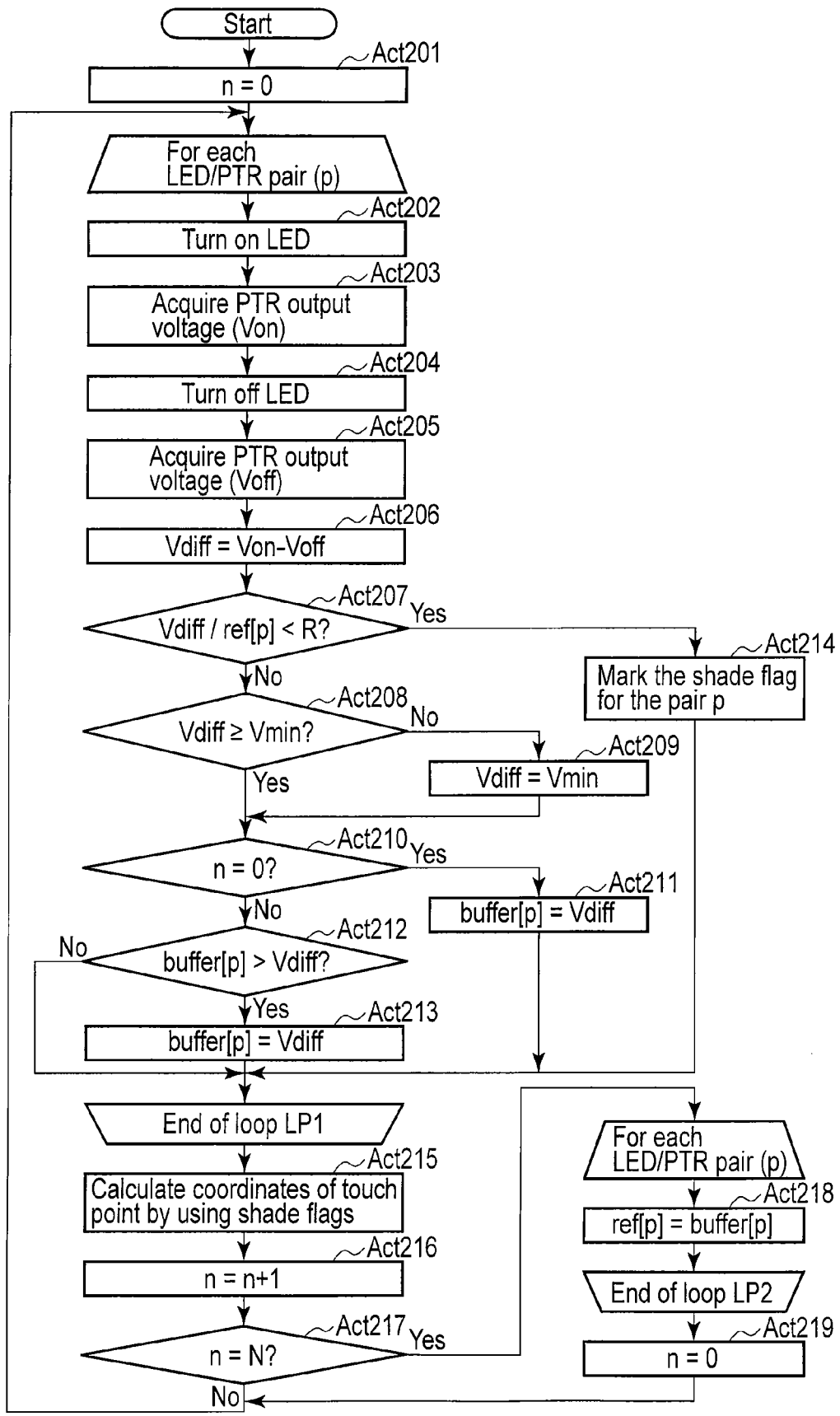
FIG. 5 is a flowchart for explaining actions of a controller according to a second embodiment.

FIG. 5 is a flowchart for explaining actions of the controller 2 according to the second embodiment. The actions shown in the flowchart are started, for example, when the coordinate recognizing apparatus starts. During the start of the coordinate recognizing apparatus, as in the first embodiment, as preparation processing, the controller 2 performs processing for forming the counter n, the variable Vdiff, the array ref(p), the array buffer(p), and the array sfg(p) in the RAM 5, determining an initial value of ref(p), and setting values of buffer (p) and sfg(p) to 0.

After the preparation processing, the controller 2 sets the counter n to 0 as in Act 101 (Act 201). Thereafter, the controller 2 enters a loop LP1 including actions in Acts 202 to 214.

In the loop LP1, first, as in Acts 102 to 106, the controller 2 causes the light emitting element of the pair indicated by the identification number p set as a processing target of the present loop LP1 to emit light (Act 202). In this state, the controller 2 obtains the output voltage Von from the light receiving element of the same pair (Act 203) and turns off the light emitting element of the same pair (Act 204). In this state, the controller 2 obtains the output voltage Voff from the light receiving element of the same pair (Act 205), calculates a difference between Von and Voff, and substitutes a calculation result in Vdiff (Act 206).

Subsequently, as in Act 107, the controller 2 determines whether a ratio of Vdiff and ref(p) related to the identification number p set as the processing target of the present loop LP1 is smaller than the threshold R for light blocking determination (Vdiff/ref(p)<R) (Act 207).

As a result of the determination in Act 207, if the ratio of Vdiff and ref(p) is equal to or larger than the threshold R for light blocking determination (Vdiff/ref(p)≥R; No in Act 207), the controller 2 determines whether Vdiff is equal to or larger than Vmin (Vdiff≥Vmin) (Act 208). Vmin is equivalent to a lower limit in a proper range of ref(p) used for the light blocking determination. A specific value of Vmin is empirically, experimentally, or theoretically determined and stored in the ROM 4 in advance.

As a result of the determination in Act 208, if Vdiff is smaller than Vmin (Vdiff<Vmin; No in Act 208), the controller 2 substitutes Vmin in Vdiff (Act 209).

As a result of the determination in Act 208, if Vdiff is equal to or larger than Vmin (Vdiff≥Vmin; Yes in Act 208) or after Act 209, the controller 2 acts as in Acts 108 to 111.

Specifically, the controller 2 determines whether a value of the counter n is 0 (Act 210). If the counter n is 0 (Yes in Act 210), the controller 2 substitutes Vdiff in buffer(p) related to the identification number p set as the processing target of the present loop LP1 (Act 211) and ends the loop LP1 related to the identification number p. If the counter n is not 0 (No in Act 210), the controller 2 determines whether Vdiff is smaller than buffer(p) related to the identification number p set as the processing target of the present loop LP1 (buffer(p)>Vdiff) (Act 212). If Vdiff is smaller than buffer(p) (buffer(p)>Vdiff; Yes in Act 212), the controller 2 substitutes Vdiff in buffer(p) (Act 213) and ends the loop LP1 related to the identification number p. As a result of the determination in Act 212, if Vdiff is equal to or larger than buffer(p) (buffer(p)≤Vdiff; No in Act 212), the controller 2 ends the loop LP1 related to the identification number p without substituting Vdiff in buffer(p).

In Act 207, if the ratio of Vdiff and ref(p) is smaller than the threshold R for light blocking determination (Vdiff/ref(p)<R; Yes in Act 207), under determination that a light path formed between the light emitting element and the light receiving element related to the pair is blocked through operation by the user, the controller 2 sets sfg(p) related to the identification number p set as the processing target of the present loop LP1 to 1 (Act 214) and ends the loop LP1 related to the identification number p.

If the action related to the loop LP1 is executed concerning the respective identification numbers p, the controller 2 acts as in Acts 113 to 117. Specifically, the controller 2 calculates coordinates of the position of operation by the user using sfg(p) and resets sfg(p) to 0 (Act 215). The controller 2 increments the value of the counter n by one (Act 216) and determines whether the value of the counter n after the increment coincides with the default number of times N (Act 217).

If the value of the counter n does not coincide with the default number of times N in Act 217 (n≠N; No in Act 217), the controller 2 enters the loop LP1 again and executes the actions related to Acts 202 to 214 concerning the pairs indicated by the identification numbers p=1 to n+m.

If the value of the counter n reaches the default number of times N before long (n=N; Yes in Act 217), the controller 2 enters the loop LP2 and rewrites ref(p) with a value of buffer (p) while incrementing the identification number p from 1 to n+m (Act 218).

If the action related to the loop LP2 is completed, the controller 2 resets the value of the counter n to 0 (Act 219). Thereafter, the controller 2 enters the loop LP1 again and repeats the actions explained above.

In this way, if the collected difference Vdiff is smaller than the lower limit Vmin set in advance, the controller 2 in this embodiment excludes the difference Vdiff from targets used for update of the reference value ref(p). With such a configuration, ref(p) is not set extremely small. It is possible to prevent a situation in which, although the operation area A is operated by the user, a light path passing the position of the operation is determined as being not blocked.

Third Embodiment

The third embodiment is explained.

As a value of the reference value ref(p) increases, since the ratio of Vdiff and ref(p) (Vdiff/ref(p)) decreases, the controller 2 tends to determine that a light path is blocked (Yes in Act 107, etc.). Therefore, if the value of ref(p) increases to be excessively large, it is not unlikely that erroneous input occurs in which, although a user does not operate the operation area A, the controller 2 calculates operation coordinates and outputs the operation coordinates to the host computer 60.

In order to cope with such a situation, the third embodiment is different from the first and second embodiments in that the value of ref(p) is kept as small as possible.

Figure 6:
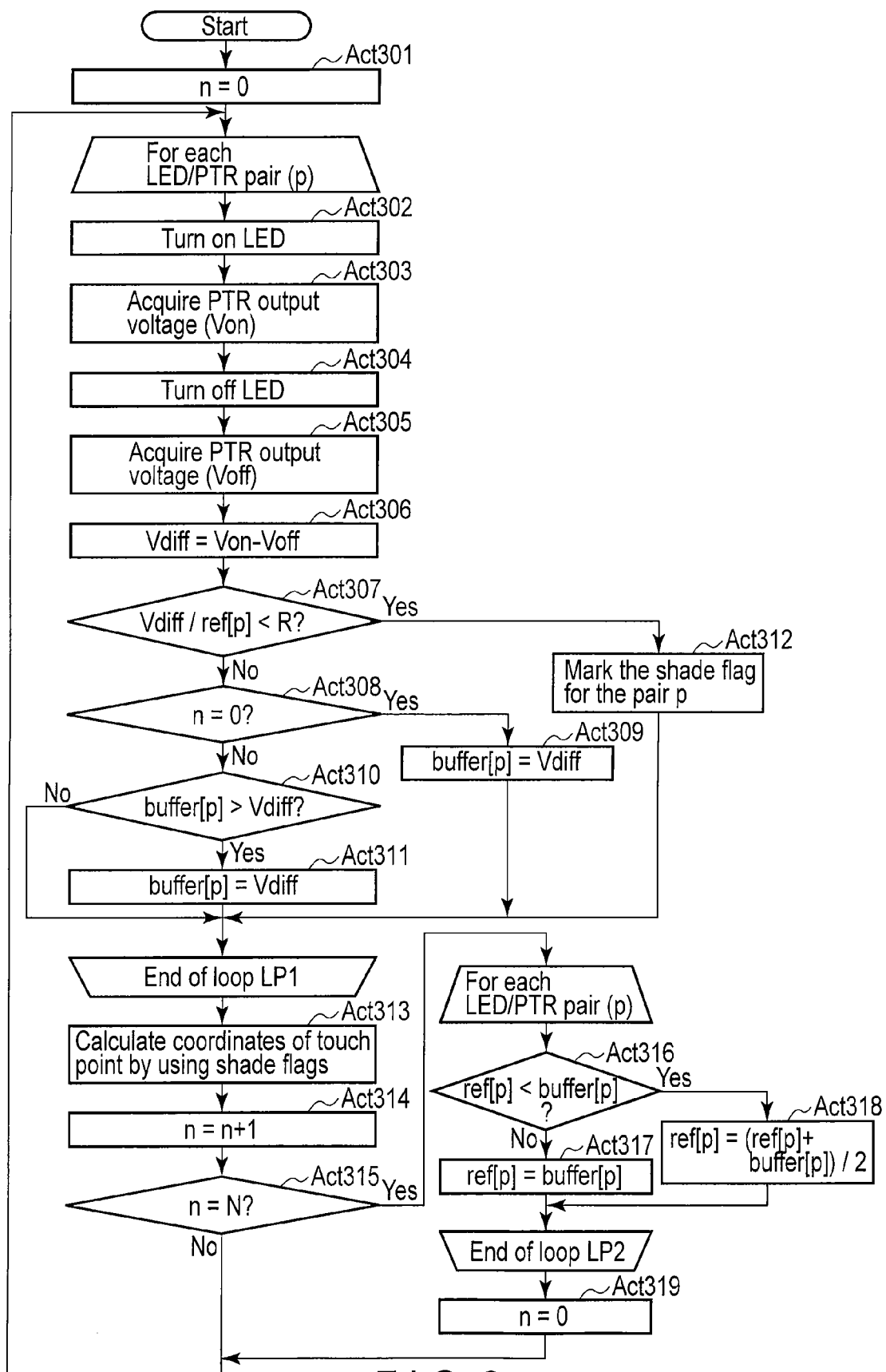
FIG. 6 is a flowchart for explaining actions of a controller according to a third embodiment.

FIG. 6 is a flowchart for explaining actions of the controller 2 according to the third embodiment. The actions shown in the flowchart are started, for example, when the coordinate recognizing apparatus starts. During the start of the coordinate recognizing apparatus, as in the first embodiment, as preparation processing, the controller 2 performs processing for forming the counter n, the variable Vdiff, the array ref(p), the array buffer(p), and the array sfg(p) in the RAM 5, determining an initial value of ref(p), and sets values of buffer(p) and sfg(p) to 0.

After the preparation processing, the controller 2 sets the counter n to 0 as in Act 101 (Act 301). Thereafter, the controller 2 enters a loop LP1 including actions in Acts 302 to 312.

The actions in Acts 302 to 312 are the same as the actions in Acts 102 to 112. Specifically, the controller 2 causes the light emitting element of the pair indicated by the identification number p set as a processing target of the present loop LP1 to emit light (Act 302). In this state, the controller 2 obtains the output voltage Von from the light receiving element of the same pair (Act 303) and turns off the light emitting element of the same pair (Act 304). In this state, the controller 2 obtains the output voltage Voff from the light receiving element of the same pair (Act 305), calculates a difference between Von and Voff, and substitutes a calculation result in Vdiff (Act 306).

If a ratio of Vdiff and ref(p) is equal to or larger than the threshold R for light blocking determination (Vdiff/ref(p)≥R; No in Act 307) and the counter n is 0 (Yes in Act 308), the controller 2 substitutes Vdiff in buffer(p) related to the identification number p set as the processing target of the present loop LP1 (Act 309) and ends the loop LP1 related to the identification number p. On the other hand, if the counter n is not 0 (No in Act 308) and Vdiff is smaller than buffer(p) related to the identification number p set as the processing target of the present loop LP1 (buffer(p)>Vdiff; Yes in Act 310), the controller 2 substitutes Vdiff in buffer(p) (Act 311) and ends the loop LP1 related to the identification number p.

If Vdiff is equal to or larger than buffer(p) (buffer(p) ≤Vdiff; No in Act 310), the controller 2 ends the loop LP1 related to the identification number p without substituting Vdiff in buffer(p).

If the ratio of Vdiff and ref(p) is smaller than the threshold R for light blocking determination in Act 307 (Vdiff/ref(p) <R; Yes in Act 307), the controller 2 sets sfg(p) related to the identification number p set as the processing target of the present loop LP1 to 1 (Act 312) and ends the loop LP1 related to the identification number p.

If the controller 2 exits the loop LP1, the controller 2 calculates coordinates of the position of operation by the user using sfg(p), resets sfg(p) to 0 (Act 313), and outputs the calculated coordinates to the host computer 60. Thereafter, the controller 2 increments a value of the counter n by one (Act 314). If the value of the counter n does not coincide with the default number of times N (n≠N; No in Act 315), the controller 2 enters the loop LP1 again and executes the actions related to Acts 302 to 312 concerning the pairs indicated by the identification numbers p=1 to n+m.

If the value of the counter n reaches the default number of times N before long (n=N; Yes in Act 315), the controller 2 enters the loop LP2 including actions in Acts 316 to 318. The actions in the loop LP2 are different from the actions in the first embodiment.

In the loop PL2, the controller 2 determines whether ref(p) related to the identification number p set as a processing target of the present loop'LP2 is smaller than buffer(p) (ref(p) <buffer(p)) (Act 316). As a result of the determination, if ref(p) is equal to or larger than buffer(p) (ref(p)≥buffer(p); No in Act 316), the controller 2 rewrites ref(p) with a value of buffer(p) (Act 317).

On the other hand, if ref(p) is smaller than buffer(p) (ref (p)<buffer(p); Yes in Act 316), the controller 2 calculates an average of the present ref(p) and the present buffer(p) (ref(p)+buffer(p))/2) and rewrites ref(p) with a result of the calculation (Act 318). In this way, a rise in ref(p) is suppressed.

Rather than simply using the average of the present ref(p) and the present buffer(p), the controller 2 may rewrite the value of ref(p) using a weighted average of the present ref(p) and the present buffer(p). Besides, in Act 318, the controller 2 only has to calculate a value smaller than buffer(p) and larger than the present ref(p) using various methods and rewrite the value of ref(p) with a result of the calculation.

If the actions related to the loop PL2 are completed concerning the respective identification numbers p, the controller 2 resets the value of the counter n to 0 (Act 319). Thereafter, the controller 2 enters the loop LP1 again and repeats the actions explained above.

In this way, if the minimum buffer(p) of the differences Vdiff collected plural times concerning a certain pair is larger the than the reference value ref(p) of the pair, the controller 2 in this embodiment rewrites the reference value ref(p) with a value smaller than the minimum buffer(p) and lager than the present reference value ref(p). With such a configuration, since a value of the reference value ref(p) is kept as small as possible, a situation in which, although the user does not operate the operation area A, operation coordinates are calculated is prevented.

Fourth Embodiment

The fourth embodiment is explained.

In the configurations in the first to third embodiments, if the intensity of disturbance light substantially changes when Von and Voff related to a pair indicated by a certain identification number p are measured, a value of Vdiff could be extremely large or extremely small. If ref(p) is determined on the basis of such Vdiff, accuracy of light blocking determination is not unlikely to be deteriorated.

In order to cope with such a situation, the fourth embodiment is different from the first to third embodiments in that Vdiff obtained when a change in the intensity of disturbance light is large is not used for determination of ref(p).

Figure 7:
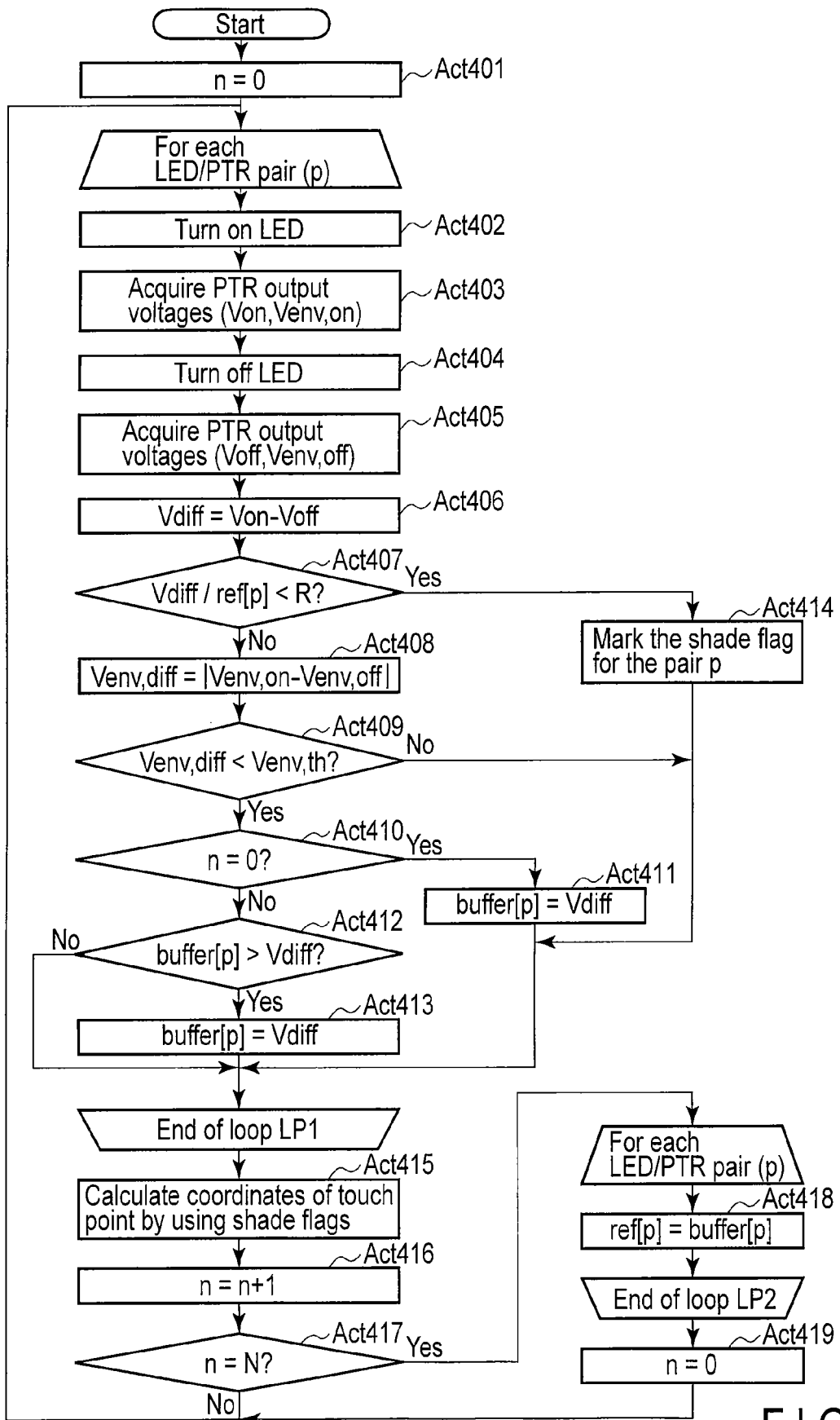
FIG. 7 is a flowchart for explaining actions of a controller according to a fourth embodiment.

FIG. 7 is a flowchart for explaining actions of the controller 2 according to the fourth embodiment.

The actions shown in the flowchart are started, for example, when the coordinate recognizing apparatus starts. During the start of the coordinate recognizing apparatus, as in the first embodiment, as preparation processing, the controller 2 performs processing for forming the counter n, the variable Vdiff, the array ref(p), the array buffer(p), and the array sfg(p) in the RAM 5, determining an initial value of ref(p), and setting values of buffer(p) and sfg(p) to 0. Further, in the preparation processing in this embodiment, the controller 2 forms a variable Venv,diff in the RAM 5.

After the preparation processing, the controller 2 sets the counter n to 0 as in Act 101 (Act 401). Thereafter, the controller 2 enters a loop LP1 including actions in Acts 402 to 414.

In the loop LP1, the controller 2 causes the light emitting element of the pair indicated by the identification number p set as a processing target of the present loop LP1 to emit light (Act 402). In this state, the controller 2 obtains the output voltage Von from the light receiving element of the same pair (Act 403). In Act 403, the controller 2 further obtains an output voltage Venv,on from the light receiving element that does not receive an infrared ray emitted from the light emitting element caused to emit light in Act 402 (the light receiving elements is hereinafter referred to as sensor S for disturbance light measurement).

For example, if any one of the light emitting elements Lx1 to Lxn arranged in the X direction is caused to emit light in Act 402, the sensor S only has to be selected out of the light receiving elements Py1 to Pym arranged in the Y direction. If any one of the light emitting elements Ly1 to Lym arranged in the Y direction is caused to emit light in Act 402, the sensor S only has to be selected out of the light receiving elements Px1 to Pxn arranged in the X direction. The sensor S may be a light receiving element provided, separately from the light receiving elements Px1 to Pxn and Py1 to Pym, in a position where infrared rays emitted from the light emitting elements Lx1 to Lxn and Ly1 to Lym are not received.

After obtaining Von and Venv,on concerning the pair indicated by the identification number p set as the processing target of the present loop LP1, the controller 2 turns off the light emitting element of the same pair (Act 404) and, in this state, obtains the output voltage Voff from the light receiving element of the same pair (Act 405). In Act 405, the controller 2 obtains an output voltage Venv,off from the sensor S.

Thereafter, as in Act 106, the controller 2 calculates a difference between Von and Voff and substitutes a calculation result in Vdiff (Act 406). As in Act 107, the controller 2 determines whether a ratio of Vdiff and ref(p) is smaller than the threshold R for light blocking determination (Vdiff/ref(p)<R) (Act 407).

As a result of the determination in Act 407, if the ratio of Vdiff and ref(p) is equal to or larger than the threshold R (Vdiff/ref(p)≥R; No in Act 407), the controller 2 calculates an absolute value of a difference between Venv,on obtained in Act 403 and Venv,off obtained in Act 405 (a fluctuation amount of the intensity of disturbance light) and substitutes a calculation result in Venv,diff (Act 408). The controller 2 determines whether Venv,diff is smaller than a threshold Venv,th (Venv,diff<Venv,th) (Act 409). Venv,th is a threshold for setting a tolerance of a fluctuation amount of the intensity of disturbance light during the measurement of Von and Voff. The threshold Venv,th is empirically, experimentally, or theoretically determined and stored in the ROM 4 in advance.

As a result of the determination, if Venv,diff is smaller than the threshold Venv,th (Venv,diff<Venv,th; Yes in Act 409), the controller 2 acts as in Acts 108 to 111.

Specifically, if the counter n is 0 (Yes in Act 410) or if the counter n is not 0 (No in Act 410) and Vdiff is smaller than buffer(p) related to the identification number p set as the processing target of the present loop LP1 (buffer(p)>Vdiff; Yes in Act 412), the controller 2 substitutes Vdiff in buffer(p) related to the identification number p set as the processing target of the present loop LP1 (Acts 411 and 413) and ends the loop LP1 related to the identification number p. On the other hand, if the counter n is not 0 (No in Act 410) and Vdiff is equal to or larger than buffer(p) (buffer(p)≤Vdiff; No in Act 412), the controller 2 ends the loop LP1 related to the identification number p without substituting Vdiff in buffer(p).

If the ratio of Vdiff and ref(p) is smaller than the threshold R for light blocking determination in Act 407 (Vdiff/ref(p)<R; Yes in Act 407), the controller 2 sets sfg(p) related to the identification number p set as the processing target of the present loop LP1 to 1 (Act 414) and ends the loop LP1 related to the identification number p.

If Venv,diff is equal to or larger than Venv,th in Act 409 (Venv,diff≥Venv,th; No in Act 409), the controller 2 ends the loop LP1 related to the identification number p without performing the actions in Acts 410 to 413.

If the actions related to the loop LP1 are executed concerning the respective identification numbers p, the controller 2 acts as in Acts 113 to 117. Specifically, the controller 2 calculates coordinates of the position of operation by the user using sfg(p) and resets the value of sfg(p) to 0 (Act 415). The controller 2 increments the value of the counter n by one (Act 416) and determines whether the value of the counter n after the increment coincides with the default number of times N (Act 417).

If the value of the counter n does not coincide with the default number of times N in Act 417 (n#N; No in Act 417), the controller 2 enters the loop LP1 again and executes the actions related to Acts 402 to 414 concerning the pairs indicated by the identification numbers p=1 to n+m.

If the value of the counter n reaches the default number of times N before long (n=N; Yes in Act 417), the controller 2 enters the loop LP2 and rewrites ref(p) with a value of buffer (p) while incrementing the identification number p from 1 to n+m (Act 418).

If the action related to the loop LP2 is completed, the controller 2 resets the value of the counter n to 0 (Act 419). Thereafter, the controller 2 enters the loop LP1 again and repeats the actions explained above.

In this way, if the fluctuation amount Venv,diff of the intensity of disturbance light indicated by a detection signal output from the light receiving element (the sensor) S during measurement of Von and Voff, which are calculation sources of the difference Vdiff, exceeds the threshold Venv,th, the controller 2 according to this embodiment excludes the difference Vdiff from targets used for the update of the reference value ref(p). With such a configuration, it is possible to eliminate the influence of disturbance light, the intensity of which substantially changes in a short period, and set a proper reference value ref(p).

Fifth Embodiment

The fifth embodiment is explained.

In an example explained in this embodiment, the actions according to the fourth embodiment are simplified.

Figure 8:
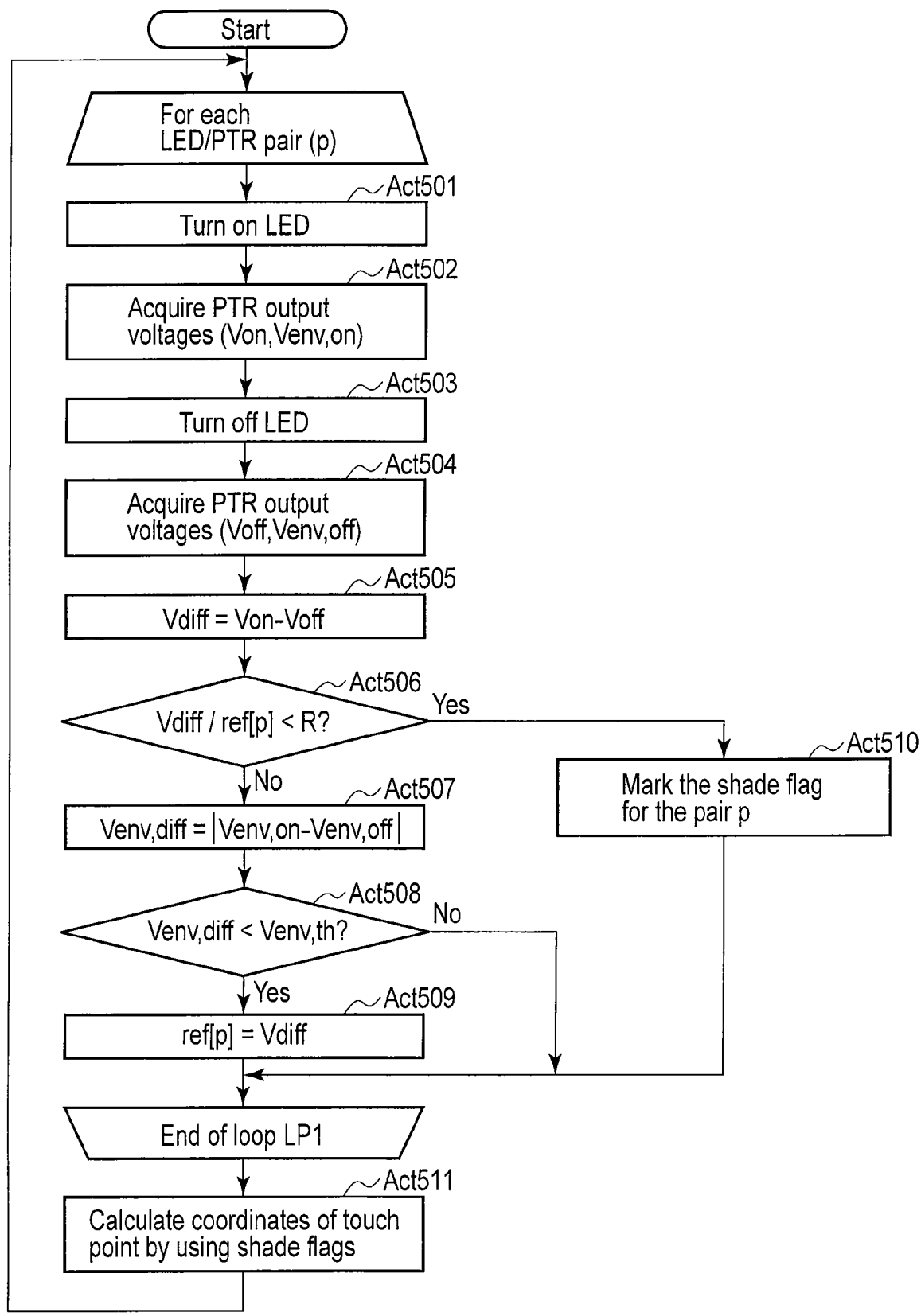
FIG. 8 is a flowchart for explaining actions of a controller according to a fifth embodiment.

FIG. 8 is a flowchart for explaining actions of the controller 2 according to the fifth embodiment. The actions shown in the flowchart are started, for example, when the coordinate recognizing apparatus starts. During the start of the coordinate recognizing apparatus, as in the fourth embodiment, as preparation processing, the controller 2 performs processing for forming the variable Vdiff, the array ref(p), the variable Venv, diff, and the array sfg(p) in the RAM 5, determining an initial value of ref(p), and setting a value of sfg(p) to 0. The counter n and buffer(p) are not formed.

After the preparation processing, the controller 2 enters a loop LP1 including actions in Acts 501 to 510. In the loop LP1, as in Acts 402 to 406, the controller 2 causes the light emitting element of the pair indicated by the identification number p set as a processing target of the present loop LP1 to emit light (Act 501). In this state, the controller 2 obtains the output voltage Von from the light receiving element of the same pair and the output voltage Venv,on from the sensor S (Act 502) and turns off the light emitting element of the same pair (Act 503). In this state, the controller 2 obtains the output voltage Voff from the light receiving element of the same pair and the output voltage Venv,off from the sensor S (Act 504). The controller 2 calculates a difference between Von and Voff and substitutes a calculation result in Vdiff (Act 505).

Thereafter, the controller 2 determines whether a ratio of Vdiff and ref(p) is smaller than the threshold R for light blocking determination (Vdiff/ref(p)<R) (Act 506). If the ratio of Vdiff and ref(p) is equal to or larger than the threshold R for light blocking determination (Vdiff/ref(p)≥R; No in Act 506), the controller 2 calculates an absolute value of a difference between Venv,on obtained in Act 502 and Venv,off obtained in Act 504 and substitutes a calculation result in Venv,diff (Act 504). The controller 2 determines whether Venv,diff is smaller than the threshold Venv,th (Venv, diff<Venv,th) (Act 508).

As a result of the determination, if the variable Venv,diff is smaller than the threshold Venv,th (Venv,diff<Venv,th; Yes in Act 508), the controller 2 rewrites ref(p) related to the identification number p set as the processing target of the present loop LP1 with a value of Vdiff (Act 509) and ends the loop LP1 related to the identification number p.

On the other hand, if Venv,diff is equal to or larger than Venv,th in Act 508 (Venv,diff≥Venv,th; No in Act 508), the controller 2 ends the loop LP1 related to the identification number p without rewriting the value of ref(p).

If the ratio of Vdiff and ref(p) is smaller than the threshold R for light blocking determination in Act 506 (Vdiff/ref(p) <R; Yes in Act 506), the controller 2 sets sfg(p) related to the identification number p set as the processing target of the present loop LP1 to 1 (Act 510) and ends the loop LP1 related to the identification number p.

If the actions related to the loop LP1 are executed concerning the respective identification numbers p, as in Act 415, the controller 2 calculates coordinates of the position of operation by the user and resets sfg(p) to 0 (Act 511). The controller 2 enters the loop LP1 again and repeats the actions explained above.

Even if the controller 2 is caused to act as explained in this embodiment, as in the fourth embodiment, it is possible to eliminate the influence of disturbance light, the intensity of which substantially changes in a short period, and set a proper reference value ref(p).

Modification

In the examples explained in the first to fourth embodiments, Vdiff is collected N times. However, Vdiff may be collected as much as possible within a predetermined time and ref(p) may be rewritten with a minimum of the collected Vdiff.

In the examples explained in the first to fifth embodiments, the reference value ref(p) is rewritten with a minimum of Vdiff collected the default number of times. However, rather than simply rewriting the reference value ref(p) with a minimum of Vdiff collected plural times, the controller 2 may perform calculation, for example, multiply the minimum with some constant and rewrite ref(p) with a result of the calculation.

The execution order of the actions shown in the flowcharts of FIGS. 4 to 8 may be changed as appropriate.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A coordinate recognizing apparatus comprising:
   plural light emitting elements;
   plural light receiving elements arranged to be opposed to the respective light emitting elements and configured to output detection signals corresponding to intensity of received light;
   a memory configured to store, concerning plural pairs of the light emitting elements and the light receiving elements set in advance, reference values used for determination of blocking of a light path; and
   a controller configured to perform, concerning the respective pairs, actions for collecting, plural times, a difference between first intensity indicated by the detection signal output from the light receiving element, which is a pair of the light emitting element, in a state in which the light emitting element is caused to emit light and second intensity indicated by a detection signal output from the light receiving element during non-light emission of the light emitting element and updating the reference value of the pair stored in the memory using a minimum of differences collected plural times.

2. The apparatus of claim 1, wherein the controller rewrites, with a minimum of differences collected plural times concerning a certain pair, the reference value of the pair stored in the memory to thereby update the reference value.

3. The apparatus of claim 1, wherein the controller performs, using the difference collected concerning a certain pair and the reference value of the pair stored in the memory, determination of blocking of a light path formed between the light emitting element and the light receiving element related to the pair and calculates coordinates of a position of operation by a user on the basis of a result obtained by performing the light blocking determination concerning the respective pairs.

4. The apparatus of claim 3, wherein, if a ratio of the difference collected concerning a certain pair and the reference value of the pair stored in the memory is smaller than a threshold set in advance, the controller determines that a light path formed between the light emitting element and the light receiving element related to the pair is blocked.

5. The apparatus of claim 3, wherein the controller updates, using a minimum of the differences obtained if it is determined in the light blocking determination that the light path is blocked among the differences collected plural times concerning a certain pair, the reference value of the pair stored in the memory.

6. The apparatus of claim 1, wherein the controller excludes, if the collected difference is smaller than a lower limit set in advance, the difference from targets used for the update of the reference value.

7. The apparatus of claim 1, wherein, if a minimum of differences collected plural times concerning a certain pair is larger than the reference value of the pair stored in the memory, the controller rewrites the reference value of the pair stored in the memory with a value smaller than the minimum and larger than the reference value to thereby update the reference value.

8. The apparatus of claim 7, wherein, if a minimum of differences collected plural times concerning a certain pair is larger than the reference value of the pair stored in the memory, the controller rewrites the reference value of the pair stored in the memory with an average of the minimum and the reference value to thereby update the reference value.

9. The apparatus of claim 7, wherein, if a minimum of differences collected plural times concerning a certain pair is smaller than the reference value of the pair stored in the memory, the controller rewrites the reference value of the pair stored in the memory with the minimum to thereby update the reference value.

10. The apparatus of claim 1, further comprising a sensor configured to output a detection signal corresponding to intensity of disturbance light, wherein
if a fluctuation amount of intensity of disturbance light indicated by detection signals respectively output from the sensor during measurement of the first intensity and the second intensity, which are calculation sources of the difference, exceeds a threshold set in advance, the controller excludes the difference from targets used for the update of the reference value.

11. The apparatus of claim 10, wherein the sensor is any one of the light receiving elements.

12. A control method for a coordinate recognizing apparatus including: plural light emitting elements; plural light receiving elements arranged to be opposed to the respective light emitting elements and configured to output detection signals corresponding to intensity of received light; and a memory configured to store, concerning plural pairs of the light emitting elements and the light receiving elements set in advance, reference values used for determination of blocking of a light path,
the method comprising performing, concerning the respective pairs:
collecting, plural times, a difference between first intensity indicated by the detection signal output from the light receiving element, which is a pair of the light emitting element, in a state in which the light emitting element is caused to emit light and second intensity indicated by a detection signal output from the light receiving element during non-light emission of the light emitting element; and
updating the reference value of the pair stored in the memory using a minimum of differences collected plural times.

13. The method of claim 12, wherein the updating the reference value includes rewriting, with a minimum of differences collected plural times, concerning a certain pair, the reference value of the pair stored in the memory to thereby update the reference value.

14. The method of claim 12, further comprising:
performing, using the difference collected concerning a certain pair and the reference value of the pair stored in the memory, determination of blocking of a light path formed between the light emitting element and the light receiving element related to the pair; and
calculating coordinates of a position of operation by a user on the basis of a result obtained by performing the light blocking determination concerning the respective pairs.

15. The method of claim 14, wherein the performing determination of blocking of a light path includes determining, if a ratio of the difference collected concerning a certain pair and the reference value of the pair stored in the memory is smaller than a threshold set in advance, that a light path formed between the light emitting element and the light receiving element related to the pair is blocked.

16. The method of claim 14, wherein the updating the reference value includes updating, using a minimum of the differences obtained if it is determined in the light blocking determination that the light path is blocked among the differences collected plural times concerning a certain pair, the reference value of the pair stored in the memory.

17. The method of claim 12, wherein if the collected difference is smaller than a lower limit set in advance, the difference is excluded from targets used for the update of the reference value.

18. The method of claim 12, wherein the updating the reference value includes rewriting, if a minimum of differences collected plural times concerning a certain pair is larger than the reference value of the pair stored in the memory, the reference value of the pair stored in the memory with a value smaller than the minimum and larger than the reference value to thereby update the reference value.

19. The method of claim 18, wherein the updating the reference value includes rewriting, if a minimum of differences collected plural times concerning a certain pair is larger than the reference value of the pair stored in the memory, the reference value of the pair stored in the memory with an average of the minimum and the reference value to thereby update the reference value.

20. The method of claim 18, wherein the updating the reference value includes rewriting, if a minimum of differences collected plural times concerning a certain pair is smaller than the reference value of the pair stored in the memory, the reference value of the pair stored in the memory with the minimum to thereby update the reference value.

* * * * *